Patented Aug. 24, 1948

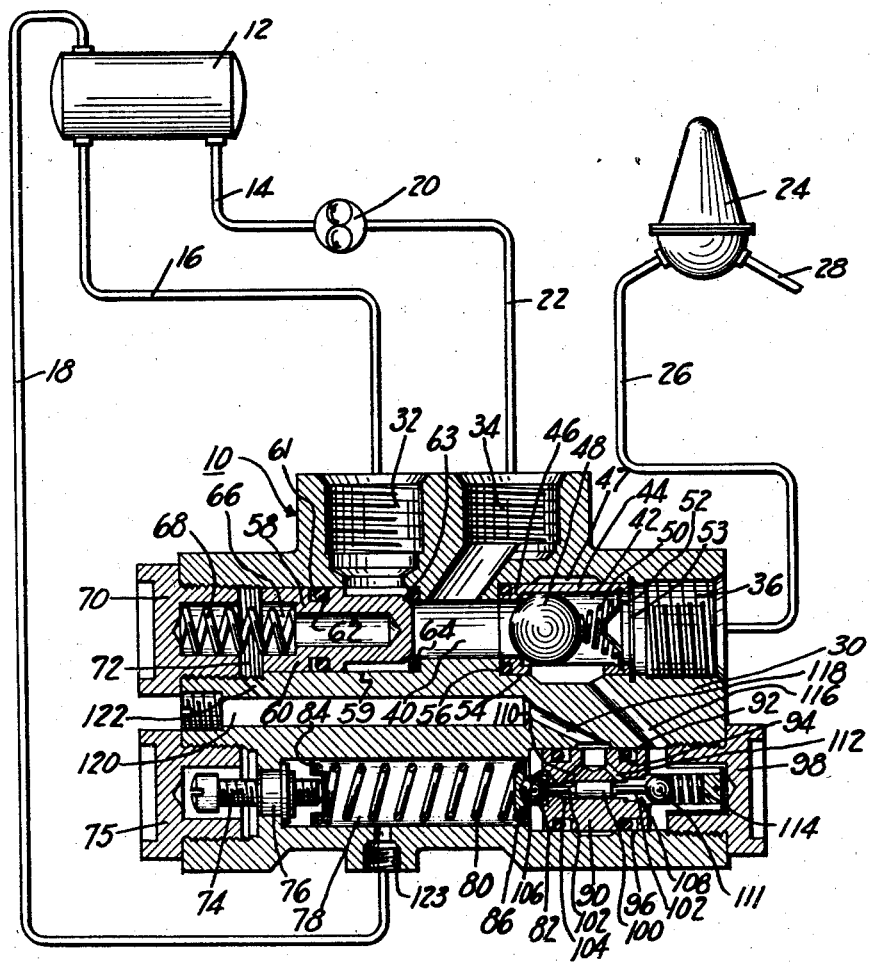

2,447,820

UNITED STATES PATENT OFFICE 2,447,820

REGULATING VALVE

Harold B. Schultz, South Bend, Ind., assignor to Bendix Aviation Corporation, South Bend, Ind., a corporation of Delaware Application September 3, 1943, Serial No. 501,080

4 Claims. (Cl. 137—153)

1

This invention relates generally to valves, of the type used in hydraulic systems, and more particularly to that class of valve commonly known as a regulator or unloading valve and is an improvement of the valves disclosed in my applications Serial No. 468,763, filed December 12, 1942, now Patent Number 2,404,102, granted July 16, 1946, and Serial Number 469,191, filed December 16, 1942, now Patent Number 2,393,571.

Valves of this type are used to a great extent in fluid pressure or hydraulic systems of aircraft and are adapted to control the flow of fluid to landing gears, brakes, ailerons and many other hydraulically actuated devices.

The conventional hydraulic system used on an aircraft includes a pump which is usually drivably connected to the aircraft engine and suited to maintain a predetermined pressure range in the system. However, it is not always advisable to employ means for disconnecting the pump from the system when the desired upper limit of pressure is reached nor to employ means for connecting the pump when the lower limit of pressure is reached. Generally the pump is directly connected to the engine and consequently continuously operated independently of the pressure within the system.

To prevent the pump from operating against a high pressure after a predetermined pressure has been attained and to cause the pump to build up the pressure to a predetermined value after a low pressure is reached, a valve is connected to the system to control the flow of pressure fluid, directing it either back to the reservoir or into the fluid pressure system.

In selecting the regulator valve it is desirable that it be of a type which is adjustable for a given pressure range and not liable to vary the limits of the range assigned.

It is a purpose of this invention to provide a regulator or unloading valve for a hydraulic system which will hold the pressure range for which it is adjusted with a minimum of variation.

Another object of the invention is to provide a regulator or unloading valve so constructed that the pressure range adjusting mechanism is divorced from the high pressure source.

A still further object of the invention lies in the provision of a regulator or unloading valve which can maintain a given range setting irrespective of the back pressure in the system.

Yet another object of the invention lies in the provision of a regulator or unloading valve utilizing a minimum of parts and simple in its operation.

2

Another very important object lies in the provision of a regulator or unloading valve which has an independent return connection to the reservoir.

Still other objects and improvements will become apparent from the following description taken in connection with the accompanying drawings.

The drawings embrace a portion of a hydraulic system in which the device of this invention is incorporated and shows the regulator or unloading valve per se in longitudinal sectional view.

A hydraulic system in which a regulator valve 10 of this invention is associated comprises a reservoir 12, having conduits 14, and 16 and 18 connecting it to a pump 20 and the valve 10 respectively. The pump 20 is connected to the valve 10 through a conduit 22. An accumulator 24 of conventional design receives pressure fluid from the valve 10 via a pipe 26, and supplies fluid under pressure to all hydraulically actuated devices within the system through a pipe 28.

The regulator valve 10 comprises generally a body member 30 having openings 32, 34 and 36, representing the return, inlet and outlet respectively, all of which are adapted to communicate with a chamber 40 formed within the body member.

To control the flow of fluid from the pump 20 to the accumulator 24, a check valve assembly 42 is provided comprising a cylindrical sleeve 44 having a seat 46 and an opening 47 in the side wall, a valve member 48 cooperating with said seat, and a spring 50 interposed between the valve member 48 and an abutment member 52 engaging said sleeve. The check valve assembly 42 is retained in a bore 54 of the body member 30 by a locking ring 53. A sealing ring 56, circumferentially disposed with respect to the cylindrical sleeve 44, prevents leakage between chamber 40 and the accumulator when the valve member 48 is seated.

In order to bypass fluid under pressure to the reservoir when the accumulator pressure has attained a predetermined value, a valve 58 slidable in a bore 59 is provided. The valve 58 comprises a poppet valve member 60 having a circumferential recess 61 in which is placed a sealing ring 62, a beveled portion 63 engaging a valve seat 64, and a counter-bore 66 adapted to receive a spring 68 which urges said valve to closed position. One end of spring 68 abuts a plug 70 threadedly connected into the bore 59 to form a working chamber 72 between the plug and valve 58.

To control the pressure of the hydraulic system within a selected range of desired operation, an adjusting mechanism, comprising a screw 74, retained in a restricted portion 76 of a bore 78, is adapted to vary the force exerted by spring 80 upon a ball valve 82. A plug 75 threadedly engages the body 30 and conceals the adjusting screw 74 from unauthorized persons who might tamper with the adjustment. The spring 80 is interpolated between spring retaining members 84 and 86, the latter of which has a cut out portion 88 suited to cooperate with the ball 82. A member 90 having annular grooves 92 adapted to receive sealing rings 94 is retained in a bore 96 by a plug 98 threadedly engaging the bore. A plunger 100, having reduced end portions 102, slidably moves in a bore 104 concentric with bores 106 and 108, the latter 108 having a greater diameter and the former 106 having a lesser diameter than the bore 104. The diameters of the bores 106 and 108 determine the "kick in" and "kick out" pressure of the valve 10. Passages 110 and 112 connect bore 106 with bore 108. The bore 106 provides a seat for the ball 82 and the bore 108 provides a seat for ball 111, which ball, as shown in the drawing, is urged against the reduced portion 102 of the plunger 100 by a spring 114 when the ball 82 has closed the bore 106 to the passage of fluid.

A passage 116 communicates the accumulator pressure or the pressure within chamber 40, if the check valve is open, to the passages 110 and 112. These passages are connected to working chamber 72 through passages 118, 120 and 122. It will therefore be apparent that chamber 72 will be subjected to accumulator pressure at such times as valve 111 is open and valve 82 is closed, and will be subjected to atmospheric or reservoir pressure, through a drain 123 and passage 18, at such times as valve 82 is open and valve 111 is closed.

The operation and adjustment of the valve is as follows:

The valve as shown indicates the position of the parts when the hydraulic pressure in the system to which the valve is connected is zero.

With no pressure on the system the pump 20 is started and fluid will be pumped into the valve 10. Since chamber 40 of valve 10 is closed to the passage of fluid by the check valve 42 and the poppet valve 58 the pressure within this chamber will immediately rise. Because the spring 50 of the check valve urging the ball 48 against its seat is weaker than the spring 68 of the poppet valve urging the valve 58 against its seat the ball 48 will be unseated by the increased pressure in chamber 40 and will allow fluid to flow to the accumulator and communicating passages 116, 110, 112, 118, 120, 122 and working chamber 72 of regulator valve 10.

Until the pressure in the accumulator has reached a predetermined high limit the balls 82 and 111 and the plunger 100 will be in the position shown in the drawings and fluid under pressure will be admitted past the unseated ball 111 and through the passages 112, 118, 120 and 122 to the working chamber 72 behind the valve 58 to thereby hold the valve tightly against the seat 64.

When the pressure in the accumulator has reached a preselected high limit determined by the adjustment of spring 80 the pressure within the passage 110 and bore 106 causes the ball 82 to move off its seat against spring 80. Unseating of ball 82 dissipates the fluid pressure within the passage 110 and bore 106 past ball 82 and creates an unbalanced pressure condition on plunger 100 with the greater pressure existing in bores 104 and 108, tending to move the plunger in a direction to further unseat ball 82 and permit the ball 111 which was formerly held off its seat by plunger 100 to be snapped against the seat formed by the large bore 108, to thereby prevent any further passage of fluid under pressure to the working chamber 72 in back of valve 58 to hold the valve on seat 64. With the ball 111 seated and ball 82 unseated the pressure previously present in the working chamber 72 is dissipated to the reservoir through passages 122, 120, 118, 110, chamber 79 and the drain connection 18.

Valve 58 opens almost simultaneously with the movement of valve 82 off its seat and valve 111 onto its seat. The exhaust of fluid through bore 106 and past ball 82 is accelerated by the pressure differential which exists between chambers 72 and 40. With the movement of valve member 82 from its seat, and a consequent reduction of pressure in chamber 72, the greater pressure in chamber 40 moves the valve 58 to open position and establishes communication to the reservoir 12 through return line 16. Upon opening of valve 58, the pressure in chamber 40 decreases whereby the check valve 48 closes under the combined influence of the spring 50 and the accumulator pressure. The pump 20 now circulates the hydraulic fluid through pipe 22, valve 10, pipe 16, and back to the reservoir 10. This cycle is continuous so long as the pump is running and the fluid pressure in the accumulator is above its preselected low value.

Should the pressure in the accumulator drop below a predetermined value the spring 80 will move the valve member 82 against the seat formed by the bore 106 and will move the valve member 111 off the seat formed by the bore 108 to establish communication with chamber 72, whereby pressure will again build up in this chamber to close valve 58. With this valve closed the pressure in chamber 40 will increase and open valve 48 whereby the pressure fluid from the pump will be supplied to the accumulator and the cycle will be repeated.

The difference between the "kick in" and "kick out" pressures, that is, the preselected pressure at which the accumulator is connected to the pump and the preselected pressure at which it is disconnected from the pump, is determined by the ratio of the areas of the seats of the valve members 111 and 82 respectively, an increase in the ratio resulting in an increase in the said difference, and vice versa. For example, if it were desirable to increase the upper pressure limit on the accumulator relative to the lower limit, it would only be necessary to replace the member 90 with another member having a smaller bore 106. Increasing or decreasing both the upper and lower pressure limits may readily be accomplished by the adjusting screw 74 which varies the compression of the spring 80 and thereby varies the upper limit pressure required to unseat ball 82 and similarly varies the lower limit pressure at which the spring 80 will unseat ball 111.

The adjusting spring 80 is adjusted for the required compressive force corresponding to the preselected pressure for the accumulator and is not subject to the back pressure in the system which condition is objectionable from the standpoint of causing the limits of the pressure range to vary as the back pressure varies.

Although but one modification of the invention has been shown and described, it is understood that the showing and description are illustrative only and the invention is not limited to the form shown and described, or otherwise, except by the terms of the following claims.

I claim:

1. A regulator valve for a hydraulic system comprising a body member having an inlet, return and outlet, a first valve means normally arranged to close communication between the inlet and outlet, a second valve means normally seated and subjected to inlet pressure on one side tending to unseat the valve and outlet pressure on the other side tending to seat said valve, a drain in the body for returning to the system the outlet fluid pressure acting on said second valve, control means comprising a first ball valve normally held on its seat by an adjusting mechanism for varying the pressure required to unseat said first ball valve, said first ball valve being unseated in response to a predetermined outlet pressure acting on said second valve means for creating a differential pressure across said last named valve to move the same in response to inlet pressure to connect the inlet and return, a second ball valve normally unseated when said first ball valve is seated and vice versa, said second ball valve being arranged to seat to cut off the pressure from the outlet port acting on second valve means when said first ball valve is unseated for releasing the outlet pressure acting on said second valve means to the drain.

2. A valve for a fluid pressure system comprising a body having inlet, outlet and return ports, a bore intersecting said ports and constructed and arranged for the passage of fluid therebetween, means in said bore between the inlet and outlet ports normally closing communication between said inlet and outlet ports and responsive to inlet port pressure for establishing communication between said ports, means in said bore between the inlet and return ports normally urged in a direction closing communication between said inlet and return ports and responsive to differential pressure, said second-named means being responsive to inlet port pressure for urging said means in the opposite direction for establishing communication between said ports, said second-named means also being urged in a direction closing communication between said inlet and return ports by the outlet pressure, a passageway connecting the outlet port to the second-named means for transmitting the outlet pressure thereto, an opening in the body to be connected to atmosphere, a second bore in the body intersecting said opening, a passage connecting the passageway to said second bore, means for controlling the outlet pressure acting on said second-named means to thereby establish communication between the inlet and return ports comprising a first ball valve seated across said passage and a second ball valve seated in said passageway, a spring in the second bore normally urging the first ball valve toward its seat, a member disposed between the ball valves and constructed and arranged to normally unseat the second ball valve when the first ball valve is seated and vice versa, and a spring normally urging said second ball valve toward its seat, said first-named spring having a greater biasing force than said second-named spring, said first ball valve constructed and arranged to respond to predetermined outlet port pressure tending to unseat the same, said second ball valve constructed and arranged for controlling the outlet pressure acting on said first ball valve and on said second-named means, whereby a differential pressure is created across said second-named means for moving the same to establish communication between said inlet and return ports, and the outlet pressure which was acting on said second-named means is released to atmosphere through said opening as a result of the unseating of said first ball valve, the cross-sectional area of the first ball valve seat being less than the cross-sectional area of the second ball valve seat, so that the predetermined outlet port pressure required to unseat the first ball valve will be greater than the pressure required to hold the second ball valve on its seat.

3. A valve for a fluid pressure system comprising a body having inlet, outlet and return ports, a bore intersecting said ports and constructed and arranged for the passage of fluid therebetween, means in said bore between the inlet and outlet ports normally closing communication between said inlet and outlet ports and responsive to inlet port pressure for establishing communication between said ports, means in said bore between the inlet and return ports normally urged in a direction closing communication between said inlet and return ports and responsive to differential pressure, said second-named means being responsive to inlet port pressure for urging said means in the opposite direction for establishing communication between said ports, said second-named means also being urged in a direction closing communication between said inlet and return ports by the outlet pressure, a passageway connecting the outlet port to the second-named means for transmitting the outlet pressure thereto, an opening in the body to be connected to atmosphere, a second bore in the body intersecting said opening, a passage connecting the passageway to said second bore, means for controlling the outlet pressure acting on said second-named means to thereby establish communication between the inlet and return ports comprising a first ball valve seated across said passage and a second ball valve seated in said passageway, a spring in the second bore normally urging the first ball valve toward its seat, adjusting means in the second bore engaging said spring for varying the force exerted by said spring in urging said first ball valve toward its seat, a member disposed between the ball valves and constructed and arranged to normally unseat the second ball valve when the first ball valve is seated and vice versa, and a spring normally urging said second ball valve toward its seat, said first-named spring having a greater biasing force than said second-named spring, said first ball valve constructed and arranged to respond to predetermined outlet port pressure tending to unseat the same, said second ball valve constructed and arranged for controlling the outlet port pressure acting on said first ball valve and on said second-named means, whereby a differential pressure is created across said second-named means for moving the same to establish communication between said inlet and return ports, and the outlet pressure which was acting on said second-named means is released to atmosphere through said opening as a result of the unseating of said first ball valve, the cross-sectional area of the first ball valve seat being less than the cross-sectional area of the second ball valve seat, so that the predetermined outlet port pressure required to unseat the first ball valve will be greater than the pressure required to hold the second ball valve on its seat.

4. A valve for a fluid pressure system comprising a body having inlet, outlet and return ports, a bore in the body intersecting the ports and constructed and arranged to provide communication therebetween, a check valve located in the bore between the inlet and outlet ports and normally seated so as to pass fluid in a direction from the inlet to outlet only, a by-pass valve located in the bore between the inlet and return ports and normally spring seated, said by-pass valve having one side subjected to inlet pressure tending to unseat the by-pass valve and the other side subjected to outlet pressure tending to seat said by-pass valve, a conduit connecting the said other side of said by-pass valve to the outlet port, a first ball valve in the conduit, a spring engaging said first ball valve and urging the same toward its seat, a drain in the valve body to be connected to atmosphere, a second bore in the body intersecting the drain, a passage connecting said second bore to the conduit at a point in the conduit between the first ball valve and the other side of said by-pass valve, a second ball valve seated across the passage, adjustable spring means located in the second bore and normally urging said second ball valve toward its seat, the biasing force of said adjustable spring means being greater than the biasing force of said first-named spring, and means arranged between the first and second ball valves so that when the first ball valve is seated the second ball valve is unseated and vice versa, the first and second ball valves being provided with seats having different effective areas and constructed and arranged to control the outlet pressure acting on said by-pass valve, whereby a pressure differential is created across said by-pass valve for moving the same to establish communication between inlet and return ports, said second ball valve being subjected to outlet port pressure and arranged to unseat at a predetermined outlet port pressure which is higher than the outlet port pressure required to maintain said first ball valve on its seat after the second ball valve has unseated.

HAROLD B. SCHULTZ.

REFERENCES CITED

The following references are of record in the file of this patent:

UNITED STATES PATENTS

| Number | Name | Date |
|---|---|---|
| 2,241,665 | Herman | May 13, 1941 |
| 2,264,375 | Hill | Dec. 2, 1941 |
| 2,312,877 | Campbell | Mar. 2, 1943 |

FOREIGN PATENTS

| Number | Country | Date |
|---|---|---|
| 4,665 | Great Britain | 1877 |
| 8,799 | Great Britain | May 3, 1895 |
| 267,978 | Great Britain | June 23, 1927 |